(12) United States Patent
Mousset et al.

(10) Patent No.: US 9,239,472 B2
(45) Date of Patent: *Jan. 19, 2016

(54) METHOD FOR DETERMINING BINOCULAR PERFORMANCE OF A PAIR OF SPECTACLE LENSES

(75) Inventors: Soazic Mousset, Charenton le Pont (FR); Cecile Petignaud, Charenton le Pont (FR); Claude Pedrono, Charenton le Pont (FR); Agnes Ladous, Charenton le Pont (FR); Bruno Amir, Charenton le Pont (FR); Aude Contet, Charenton le Pont (FR)

(73) Assignee: ESSILOR INTERNATIONAL (COMPAGNIE GENERALE D'OPTIQUE), Charenton Le Pont (FR)

( * ) Notice: Subject to any disclaimer, the term of this patent is extended or adjusted under 35 U.S.C. 154(b) by 778 days.

This patent is subject to a terminal disclaimer.

(21) Appl. No.: 13/510,847

(22) PCT Filed: Nov. 18, 2010

(86) PCT No.: PCT/EP2010/067778
§ 371 (c)(1), (2), (4) Date: Jul. 30, 2012

(87) PCT Pub. No.: WO2011/061268
PCT Pub. Date: May 26, 2011

(65) Prior Publication Data
US 2012/0287405 A1 Nov. 15, 2012

(30) Foreign Application Priority Data
Nov. 18, 2009 (EP) .................................. 09306112

(51) Int. Cl.
*G02C 7/06* (2006.01)
*G01M 11/02* (2006.01)
*G02C 7/02* (2006.01)

(52) U.S. Cl.
CPC ............ *G02C 7/061* (2013.01); *G01M 11/0228* (2013.01); *G02C 7/024* (2013.01); *G02C 7/027* (2013.01)

(58) Field of Classification Search
CPC ........ G02C 7/024; G02C 7/025; G02C 7/027; G02C 13/005
USPC ............. 351/159.74, 159.75, 159.76, 159.77, 351/204, 246
See application file for complete search history.

(56) References Cited

U.S. PATENT DOCUMENTS

| | | | |
|---|---|---|---|
| 6,979,084 B2 | 12/2005 | Qui | |
| 8,733,931 B2* | 5/2014 | Mousset et al. | .......... 351/159.75 |
| 2008/0106697 A1 | 5/2008 | Pedrono | |
| 2011/0051082 A1 | 3/2011 | Becken et al. | |

FOREIGN PATENT DOCUMENTS

| | | |
|---|---|---|
| DE | 10 2007 062929 | 7/2009 |
| WO | WO 2007/068818 | 6/2007 |
| WO | WO 2007/068819 | 6/2007 |

OTHER PUBLICATIONS

Simonet, P. et al., "Distortion Induced by Ophthalmic Lenses", Vision Search vol. 35, Oct. 1995. (1 Sheet).
(Continued)

*Primary Examiner* — Huy K Mai
(74) *Attorney, Agent, or Firm* — Cozen O'Connor

(57) ABSTRACT

A method of determining binocular performance of a pair of spectacle lenses comprises: a eyes characteristics providing step, a pair of spectacle lenses providing step, a environment providing step, a binocular performance criteria selecting step, and a binocular performance criteria determining step, wherein the at least one binocular performance criterion is selected among one or a combination of the following criteria groups consisting of central vision criteria group and/or peripheral vision criteria group.

16 Claims, 8 Drawing Sheets

(56) References Cited

OTHER PUBLICATIONS

Points de vue n° 42—Printemps 2000—<< Varilux Panamic, la demarche de Conception, Spring 2000 reprint, pp. 1-8.
Esser, G. et al., "Die Performance Individueller Gleitsichtgläser", Dec. 1, 2005, pp. 38-44.
Hansard, M. et al., "Cyclopean Geometry of Binocular Vision", vol. 25, No. 9 Aug. 22, 2008, pp. 2357-2369.

* cited by examiner

METHOD FOR DETERMINING BINOCULAR PERFORMANCE OF A PAIR OF SPECTACLE LENSES

RELATED APPLICATIONS

This is a U.S. National Phase application under 35 USC 371 of International Application PCT/EP2010/067778 filed on Nov. 18, 2010.

This application claims the priority of European application no. 09306112.5 filed Nov. 18, 2009, the entire content of which is hereby incorporated by reference.

FIELD OF THE INVENTION

The invention relates to a method for determining binocular performance of a pair of spectacle lenses when a visual environment is seen by the right and left eyes of a wearer through right and left spectacle lenses respectively.

The invention further relates to a method for optimizing a pair of spectacle lenses by optimizing the value of at least one binocular criterion determined according to a determining method according to the invention.

BACKGROUND OF THE INVENTION

Methods for determining the performance of ophthalmic lenses are well known from the person skilled in the art. Such methods are often used in optimization method to optimize the design of ophthalmic lenses, for example of progressive ophthalmic lenses.

Most of the methods of the prior art are monocular determination methods, wherein the performance of the left and right ophthalmic lenses are evaluated independently one from the other.

Since a person observes its environment with both eyes, the simulation of visual perception with a single eye is not always sufficient for the purpose of expressing and evaluating the visual perception of an environment observed through spectacle glasses.

Document U.S. Pat. No. 6,979,084 discloses a determining method for determining binocular performance of a pair of spectacle lenses. The method disclosed in U.S. Pat. No. 6,979,084 provides the possibility of evaluating the binocular performances of a pair of ophthalmic lenses for an average wearer and only for specific criteria such as binocular residual correction error or binocular vertical deviation. Therefore, the binocular performance determination method disclosed in U.S. Pat. No. 6,979,084 may not always be sufficient for the purpose of expressing and evaluating the visual perception of an environment observed through spectacle glasses by a given wearer.

SUMMARY OF THE INVENTION

The present invention makes it possible to evaluate new optical criteria of the binocular visual perception of a given environment observed through spectacle glasses by a given wearer.

Thereby, one aspect of the invention relates to a method, for example implemented by computer means, for determining binocular performance of a pair of spectacle lenses when a visual environment is seen by the right and left eyes of a wearer through right and left spectacle lenses respectively, comprising:

a eyes characteristics providing step in which eyes characteristics data representing the characteristics of the right and left eyes of the wearer are provided, a pair of spectacle lenses providing step (S2) in which spectacle data representing the pair of spectacle lenses are provided, a environment providing step in which visual environment data representing a visual environment are provided, a binocular performance criteria selecting step in which at least one binocular performance criterion which expresses the binocular performance of the pair of spectacle lenses for viewing an object point in the visual environment is selected, a binocular performance criteria determining step in which the at least one binocular performance criterion is determined for a plurality of object points distributed in the visual environment, wherein the at least one binocular performance criterion is selected among one or a combination of the following criteria groups consisting of:

central vision criteria group consisting of:
  total prismatic deviation in central vision,
  horizontal ocular deviation in central vision,
  total ocular deviation in central vision,
  variation of any of the preceding central vision criteria, peripheral vision criteria group consisting of:
  power in peripheral vision,
  astigmatism in peripheral vision,
  horizontal prismatic deviation in peripheral vision,
  vertical prismatic deviation in peripheral vision,
  total prismatic deviation in peripheral vision,
  total pupil field ray deviation,
  horizontal pupil field ray deviation,
  vertical pupil field ray deviation,
  magnification in peripheral vision,
  variation of any of the preceding peripheral vision criteria,
  added horizontal disparity,
  total horizontal disparity,
  added vertical disparity,
  total vertical disparity,
  rotation binocular cyclodisparity,
  fusional horizontal translation, and
  fusional vertical translation.

Advantageously, the method of determining the binocular performances of a pair of ophthalmic lenses according to the invention allows determining new optical criteria. The inventors have observed that theses new optical criteria may be of interest when determining the binocular performances of a pair of ophthalmic lenses.

According to further embodiments of the invention, the method according to the invention may comprise the following features alone or in combination:

the method further comprises:
  a cyclopean eye positioning step in which the cyclopean eye of the wearer is positioned, and
  the position of the cyclopean eye is customized according to the wearer;

the method further comprises a eye positioning step in which the center of rotation of the left and right eyes are positioned relative to each other;

the visual environment data are customized according to the age of the wearer and/or the posture of the wearer and/or the ethnicity of the wearer and/or the type of environment in which the wearer is to use the spectacle lenses, and/or the prescription of the wearer, and/or the activities of the wearer, and/or the head/eye coordination of the wearer, and/or the anatomy of the wearer;

the eyes characteristics data comprise measured values, for example inter-pupil distance or pupil height, of the relative position of the left and right eyes of the wearer, and during the eye positioning step the center of rotation of the left and right eyes are positioned relative to each other according to the measured values;

the spectacle data comprise mounting data of the spectacle lenses and the method further comprises, and prior to the binocular performance criteria determining step, a spectacle lenses positioning step in which the spectacle lenses are positioned according to the mounting data;

the spectacle data comprise for the right and left spectacle lenses the vertex distance and/or the pantoscopic angle and/or the wrap angle of the spectacle lens, and the method further comprises, prior to the binocular performance criteria determining step, a spectacle lenses positioning step in which the left and right spectacle lenses are positioned relative to the center of rotation of the right and left eyes respectively according to the vertex distance and/or the pantoscopic angle and/or the wrap angle;

in central vision the binocular performance criteria determining step comprise:
- a cyclopean gaze direction sampling step in which the visual environment is sampled based on a cyclopean gaze direction $(\alpha, \beta)$,
- a object point determining step in which for each cyclopean gaze direction $(\alpha, \beta)$ a corresponding object point of the visual environment is determined,
- a left eye direction determining step in which for each of the object points determined during the object point determining step the left direction $(\alpha L, \beta L)$ of a ray starting from the center of rotation of the left eye and focusing trough the left spectacle lens to the corresponding object point of the visual environment is determined,
- a right eye direction determining step in which for each of the object points determined during the object point determining step the right direction $(\alpha R, \beta R)$ of a ray starting from the center of rotation of the right eye and focusing trough the right spectacle lens to the corresponding object point of the visual environment is determined,
- a left eye monocular performance criteria determining step in which for each of the directions $(\alpha L, \beta L)$ determined during the left eye direction determining step at least one left monocular performance criterion for the left spectacle lens is determined,
- a right eye monocular performance criteria determining step in which for each of the directions $(\alpha R, \beta R)$ determined during the right eye direction determining step at least one right monocular performance criterion for the right spectacle lens is determined, and
- at least one binocular criterion is determined according to the at least one right and left monocular performance criterion;

in peripheral vision the binocular performance criteria determining step comprise:
- a cyclopean gaze direction determining step in which a cyclopean gaze direction is determined,
- a first object point determining step in which for the cyclopean gaze direction a corresponding object point of the visual environment is determined,
- a left eye direction determining step in which for the object point determined during the first object point determining step the left direction of a ray starting from the center of rotation of the left eye and focusing trough the left spectacle lens to the corresponding object point of the visual environment is determined,
- a left pupil positioning step in which the pupil of the left eye corresponding to the left direction is positioned,
- a right eye direction determining step in which for the first object point determined during the object point determining step the right direction of a ray starting from the center of rotation of the right eye and focusing trough the right spectacle lens to the corresponding object point of the visual environment is determined,
- a right pupil positioning step in which the pupil of the right eye corresponding to the right direction is positioned,
- a cyclopean gaze direction sampling step in which the visual environment is sampled based on a cyclopean gaze direction,
- a second object point determining step in which for each cyclopean gaze direction a corresponding object point of the visual environment is determined,
- a left pupil direction determining step in which for each of the object points determined during the second object point determining step the left direction of a ray starting from the pupil of the left eye and focusing trough the left spectacle lens to the corresponding object point of the visual environment is determined,
- a right pupil direction determining step in which for each of the object points determined during the second object point determining step the right direction of a ray starting from the pupil of the right eye and focusing trough the right spectacle lens to the corresponding object point of the visual environment is determined,
- a left eye monocular performance criteria determining step in which for each of the directions determined during the left pupil direction determining step at least one left monocular performance criterion for the left spectacle lens is determined,
- a right eye monocular performance criteria determining step in which for each of the directions determined during the right pupil direction determining step at least one right monocular performance criterion for the right spectacle lens is determined, and
- at least one binocular criterion is determined according to the at least one right and left monocular performance criterion.

Another aspect of the invention relates to an optimizing method, for example implemented by technical means, for optimizing at least a lens of a pair of spectacle lenses by optimizing the value of at least one binocular criterion determined according to the invention. According to an embodiment of the invention, the right or left lens of a pair of spectacle lenses can be optimized as follows: the optimization method may comprise minimizing a cost function, for example the cost function may be of the type of the Least squares.

For example the cost function may be:

$$CF = \sum_i \sum_k^n \alpha_{ki}(V_{ki} - VC_{ki})^2$$

With n the total number of criteria considered, i the cyclopean gaze direction, $\alpha_{ki}$ the weight of each criteria, $Vc_{ki}$ the target value of the k-th criteria in the cyclopean gaze direction i, $V_{ki}$ the value of the k-th criteria in the cyclopean gaze direction i. The cost function may comprise binocular criteria and monocular criteria of the lens to be optimized.

For example, one may choose a binocular and monocular criterion to ensure achievement of the prescribed power. For example, one may seek to minimize horizontal disparities added while maintaining the prescribed power of the lens to be optimized.

According to an embodiment of the invention, the technical means are calculating means and/or processing means and/or computer means. According to an embodiment of the invention, the technical means are the same as the one used to implement the method for determining the binocular criterion.

The optimizing method may further comprise:
- a lenses providing step, in which a pair of spectacle lenses is provided,
- an analyzing step, in which the binocular performance of the pair of spectacle lenses is analyzed according to a method according to the invention,
- an modifying step, in which an modifying step, in which at least one of the two lens of the pair of spectacle lenses is modified, wherein the analyzing and modifying steps are implemented by technical means and repeated so as to optimize the binocular performance of the pair of spectacle lenses.

The invention further relates to a method for manufacturing a pair of spectacle lenses comprising successively:
- an optimizing step, in which the pair of spectacle lenses is optimized using a method according to the invention and
- a manufacturing step, in which the pair of spectacle lenses is manufactured.

The invention also relates to a computer program product comprising one or more stored sequence of instruction that is accessible to a processor and which, when executed by the processor, causes the processor to carry out the steps of a method according to the invention.

The invention further relates to a computer readable medium carrying one or more sequences of instructions of the computer program product of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer or Very high speed integrated circuit Hardware Description Language ("VHDL"), or Complex Instruction Set Computer ("CISC") architecture, for example X 86, or Reduced Instruction Set Computer ("RISC") architecture, for example ARM.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the context of the present invention, the aforementioned terms are understood according to the following definitions:

- The vertex distance is the distance between the back surface of the lens and the apex of the cornea, measured usually along the visual axis of the eye in the primary position, usually taken to be the horizontal.
- The pantoscopic angle is the angle in the vertical plane between the optical axis of the spectacle lens and the visual axis of the eye in the primary position, usually taken to be the horizontal.
- The wrap angle is the angle in the horizontal plane between the optical axis of the spectacle lens and the visual axis of the eye in the primary position, usually taken to be the horizontal.
- Each lens of a pair of spectacle lenses is defined by the modelling of all its surfaces, the refractive index of the glasses and the position of each surface relatively to each other (offset, rotation and tilt). These elements are referred as the parameters of the optical system. Surfaces of an optical system are usually represented according to a polynomial or parametric equation obtained by using a model based on the B-splines or Zernike polynomials. These models give continuous curvature on the whole lens. Surfaces can also be Fresnel or pixelized surfaces. The refractive index of materials can be inhomogeneous and depend on some parameters of the optical system.
- Central vision (also referred as foveal vision) describes the work of the fovea, a small area in the center of the retina that contains a rich collection of cones. In a central vision situation, an observer looks at an object which stays in a gaze direction and the fovea of the observer is moved to follow the object. Central vision permits a person to read, drive, and perform other activities that require fine and sharp vision.
- A gaze direction is defined by two angles measured with regard to a direct orthonormal basis centered on the center of rotation of the right or left eye.
- A cyclopean gaze direction is defined by two angles measured with regard to a direct orthonormal basis centered on the center of rotation of the cyclopean eye.
- Peripheral vision describes the ability to see objects and movement outside of the direct line of vision. In a peripheral vision situation, an observer looks in a fixed gaze direction and an object is seen out of this direct line of vision. The direction of a ray coming from the object to the eye is then different from the gaze direction and is referred as peripheral ray direction.
- A peripheral ray direction is defined by two angles measured with regard to a direct orthonormal basis centered on the eye entrance pupil and moving along the gaze direction axis for the right or left eyes.

Variation of a central vision criterion evaluated thanks to an evaluation function in a particular gaze direction $(\alpha_1, \beta_1)$ according to a component of the gaze direction is understood as the derivative of the said evaluation function of the said criterion with respect to the said component. Considering a evaluation function $H_k$, one can consider the partial derivative of $H_k$ with respect to $$\alpha: \frac{\partial H_k}{\partial \alpha}(\alpha_1, \beta_1).$$

One can consider the partial derivative of $H_k$ with respect to $$\beta: \frac{\partial H_k}{\partial \beta}(\alpha_1, \beta_1).$$

Variation of a criteria can be evaluated as the composition of the partial derivatives of the evaluation function with respect to $\alpha$ and/or to $\beta$, as for example:

$$\frac{\partial H_k}{\partial \alpha}(\alpha_1, \beta_1),$$

or, $$\frac{\partial H_k}{\partial \beta}(\alpha_1, \beta_1),$$

or $$\sqrt{\left(\frac{\partial H_k}{\partial \alpha}(\alpha_1, \beta_1)\right)^2 + \left(\frac{\partial H_k}{\partial \beta}(\alpha_1, \beta_1)\right)^2}.$$

Magnification in peripheral vision is defined as the ratio between the apparent angular size (or the solid angle) of an object seen in peripheral vision without lens and the apparent angular size (or the solid angle) of an object seen through the lens in peripheral vision.

Magnification in central vision is defined as the ratio between the apparent angular size (or the solid angle) of an object seen in central vision without lens and the apparent angular size (or the solid angle) of an object seen through the lens in central vision.

Variation of a peripheral vision criterion evaluated thanks to an evaluation function in a particular ray direction $(\alpha'_1, \beta'_1)$ according to a component of the ray direction is understood as the derivative of the said evaluation function of the said criterion with respect to the said component. Considering a evaluation function $H_k$, one can consider the partial derivative of $H_k$ with respect to $\alpha'$:

$$\frac{\partial H_k}{\partial \alpha'}(\alpha'_1, \beta'_1).$$

One can consider the partial derivative of $H_k$ with respect to $\beta'$:

$$\frac{\partial H_k}{\partial \beta'}(\alpha'_1, \beta'_1).$$

Variation of a criteria can be evaluated as the composition of the partial derivatives of the evaluation function with respect to $\alpha'$ and to $\beta'$, as for example:

$$\frac{\partial H_k}{\partial \alpha'}(\alpha'_1, \beta'_1)$$

or $$\frac{\partial H_k}{\partial \beta'}(\alpha'_1, \beta'_1),$$

or $$\sqrt{\left(\frac{\partial H_k}{\partial \alpha'}(\alpha'_1, \beta'_1)\right)^2 + \left(\frac{\partial H_k}{\partial \beta'}(\alpha'_1, \beta'_1)\right)^2}.$$

The posture of the wearer may be defined by posture parameters well known from the person skilled in the art. WO2007/068818 and WO 2007/068819 illustrate such posture parameters.

The visual environment may be defined by the distances of object points as a function of the gaze directions. For example, the visual environment may be defined as the distances between the object points and the cyclopean eye as a function of the cyclopean gaze directions.

The activities of the wearer may be understood as the visual habits of the wearer. The activities of the wearer may be chosen among the following examples: near vision activities such as reading or writing, close vision activities such as sewing or modeling, far vision activities such as shooting, intermediate vision activities such as computer, or other types of activities such as frequent driving, intensive reading, or high movement activities such as sport.

The head/eye coordination of the wearer corresponds to the ability of a wearer to have the movement of his eyes and his head coordinate when looking trough a visual environment.

Power in peripheral vision is defined as the power generated by the optical system when the wearer observes an object in peripheral vision;

astigmatism in peripheral vision is defined as the astigmatism generated by the optical system both as regards amplitude and the axis when the wearer observes an object in peripheral vision;

total prismatic deviation in central vision is defined in the object space by the angular deviation of a ray issued from the center of rotation of the eye introduced by the quantity of prism of the lens;

horizontal prismatic deviation in central vision is defined in the object space by the angular deviation in an horizontal plan of a ray issued from the center of rotation of the eye introduced by the quantity of prism of the lens;

vertical prismatic deviation in central vision is defined in the object space by the angular deviation in an vertical plan of a ray issued from the center of rotation of the eye introduced by the quantity of prism of the lens;

total prismatic deviation in peripheral vision is the angular deviation of a ray issued from the center of the entrance pupil introduced by the quantity of prism of the lens;

horizontal prismatic deviation in peripheral vision is the angular deviation in an horizontal plan of a ray issued from the center of the entrance pupil introduced by the quantity of prism of the lens;

vertical prismatic deviation in peripheral vision is the angular deviation in an vertical plan of a ray issued from the center of the entrance pupil introduced by the quantity of prism of the lens;

total ocular deviation is defined in central vision and describes the fact that adding a lens causes an eye to rotate in order to stay focused on the same object. The angle can be measured in prismatic diopters;

horizontal ocular deviation corresponds to the horizontal component of the total ocular deviation;

the deformation of a series of points is obtained by a system of ray tracing that provides the localisation of different components of the visual environment, seen by the wearer trough the pair of spectacle lenses in peripheral vision independently of the area of the spectacle lenses used in central vision, the system consist in calculating the image of each point of the series of points trough the pair of spectacle lenses, examples of definition of deformations are given in "Points de vue" n°42—Printemps 2000—Varilux Panamic, la démarche de conception and in "Vision research", vol. 35 supplement, October 1995, p S245—Distorsion induced by ophthalmic lenses—Simonet P., Bourdoncle B., Miége C., Gresset J., Faubert J, the disparities may be determined by defining:
- a cyclopean gaze fixation direction between the cyclopean eye and a fixation point F of the visual environment,
- a first plan P1 comprising the centers of rotation of the right and left eyes and the fixation point F of the visual environment,
- a second plan P2 orthogonal to the line joining the centers of rotation of the right and left eyes and comprising the fixation point F of the visual environment,
- a calculation plan P3 orthogonal to the first and second plans and situated at a given distance of the cyclopean eye,
- to define the total disparity, the visual environment is sampled into a plurality of cyclopean gaze directions; a series of points corresponding to the intersections of each cyclopean gaze direction with the calculation plan P3 is defined,
- a deformation of the series of points comprised in the calculation plan P3 is determined trough the right and left lens, each eyes staring at the fixation point F, this determination gives for each eye, and in relation to its visual axis, the angular position of all the points of the deformation of the series of points,
- the fixation disparity is canceled, if necessary by subtracting to all the positions the position of the fixation point F,
- each point of the point of the series of points is deformed into a left deformation point and right deformed point, called conjugated,
- the total disparity is defined as the difference in angular position of the conjugated points,
- the total horizontal disparity is defined as the difference in angular position of the conjugated points in the first plan P1,
- the total vertical disparity is defined as the difference in angular position of the conjugated points in the second plan P2, the natural disparity is defined as the total disparity when the wearer is looking directly at the fixation point F of the visual environment, without the spectacle lenses,
- the added disparity corresponds to the difference between the total and the natural disparities,
- the added horizontal disparity corresponds to the difference between the total horizontal and the natural horizontal disparities,
- the added vertical disparity corresponds to the difference between the total vertical and the natural vertical disparities.

The cyclodisparities may be determined further to the disparities by first defining:
- a first axis A1 comprised in the calculation plan P3 and colinear to the line joining the centers of rotation of the right and left eyes,
- a second axis A2 comprised in the calculation plan P3 and perpendicular to the first axis A1, and by:
  - selecting a analytic cone having its axis corresponding to the cyclopean gaze fixation direction and having a total angle comprised between 0° and 180°,
  - calculating the deformation of the series of points for the right an left eyes (as for the disparities),
  - applying to the two deformed series of points a translation movement along the first axis A1, the second axis A2 and a rotation around the visual axis of the right and left eye so as to minimize the position differences on the analytic cone (vertical, or horizontal or both) between the conjugated points of the two deformed series of points, this may be done by minimizing their RMS in the analytic cone:
- the amount of translation between the two deformed series of points along the first axis A1 corresponds to the fusional horizontal translation,
- the amount of translation between the two deformed series of points along the second axis A2 corresponds to the fusional vertical translation,
- the amount of rotation between the two deformed series of points around the visual axis of the right and left eye corresponds to the rotation binocular cyclodisparity.

BRIEF DESCRIPTION OF THE DRAWINGS

Non limiting embodiments of the invention will now be described with reference to the following drawings, wherein.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
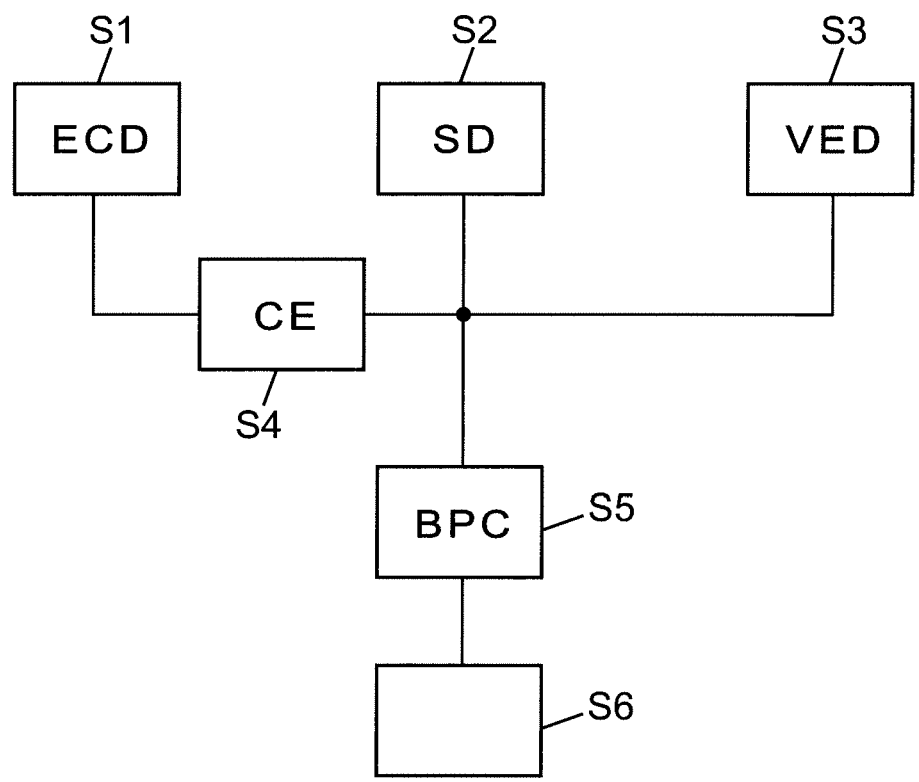
FIG. 1 a flowchart of the steps of an embodiment of the method according to the invention.

According to an embodiment of the invention illustrated on FIG. 1, the method of determining binocular performance of a pair of spectacle lenses comprises:
- a eyes characteristics providing step S1,
- a pair of spectacle lenses providing step S2,
- a environment providing step S3, a cyclopean eye positioning step S4, a binocular performance criteria selecting step S5, and a binocular performance criteria determining step S6.

During the eyes characteristics providing step S1, eyes characteristics data ECD representing the characteristics of the right and left eyes of the wearer are provided.

The eyes characteristics data ECD may comprise measured values, for example inter-pupil distance or pupil height, or the relative position of the left and right eyes of the wearer or the position of the center of rotation of the left and right eyes of the wearer. Advantageously, having measured values increases the accuracy of the overall method.

The eyes characteristics data ECD may comprise average values based on known average values of the relative position of the left and right eyes of the wearer.

During the pair of spectacle lenses providing step S2, spectacle data SP representing the pair of spectacle lenses are provided.

According to an embodiment of the invention, the spectacle data SP comprise mounting data of the spectacle lenses.

According to an embodiment of the invention, the spectacle data comprise for the right and left spectacle lenses the vertex distance and/or the pantoscopic angle and/or the wrap angle of the spectacle lens.

During the environment providing step S3, visual environment data VED are provided. The visual environment data VED represent a visual environment that the wearer could see trough the spectacle lenses.

According to an embodiment of the invention, the visual environment may vary according to the wearers activities. For example in lower cyclopean gaze direction, the distance between the cyclopean eye and the object point is smaller for a computer user (attaching a keyboard) than for a trekker (soil fixation).

According to an embodiment of the invention, the visual environment may vary according to the wearer's anatomy. For example in lower cyclopean gaze direction, the distance between the cyclopean eye and the object point is smaller for a small person than for a tall person.

According to an embodiment of the invention, the visual environment may vary according to the wearers age. For example in lower cyclopean gaze direction, the distance between the cyclopean eye and the object point is smaller for a child than for an adult.

According to an embodiment of the invention, the visual environment may vary according to the wearer's posture. For example to look at a computer the distance between the cyclopean eye and the object point is different for a wearer who stands upright or bent.

According to an embodiment of the invention, the visual environment may vary according to the wearer's ethnicity. For example in lower cyclopean gaze direction, the distance between the cyclopean eye and the object point is smaller for an Asian wearer than for a Caucasian wearer.

The visual environment may be individually customized for a given wearer by measuring for each cyclopean gaze direction of a visual space of a given wearer the distance between the object point and the cyclopean eye.

According to an embodiment of the invention, typical visual environments may be defined. For example, for each member of a group of given wearers (eg group of wearers of 10 years old, or group of wearers of 20 years old) an individually customized environment is measured, and the typical environment is determined as a combination of the individually customized environments of the members of a same group (eg the average).

According to an embodiment of the invention, to overcome the tedious process of measuring the wearer's individually customized visual environment, the visual environment may be adapted to a given wearer without going trough the process of individual measurements. For example the skilled person may build a database of typical environments and then set the visual environment best suited to the wearer. For example for a 15 years old wearer the visual environment may be determined by interpolation of the typical visual environment corresponding to 10 years old wearers and the typical visual environment corresponding to 20 years old wearers.

According to another example of the invention, for a 11 years old wearer the visual environment may be chosen as the typical visual environment of 10 years old wearers.

According to an embodiment of the invention, the visual environment data VED are customized according to the age of the wearer and/or the posture of the wearer and/or the ethnicity of the wearer and/or the type of environment in which the wearer is to use the spectacle lenses, and/or the prescription of the wearer, and/or the activities of the wearer, and/or the head/eye coordination of the wearer, and/or the anatomy of the wearer.

During the cyclopean eye positioning step S4, the cyclopean eye CE of the wearer is positioned. The position of the cyclopean eye CE may be customized or correspond to an average position.

According to an embodiment of the invention, the cyclopean eye CE may be positioned according to a measured position. The person skilled in the art may use any known measuring method to determine the position of the cyclopean eye CE.

According to an embodiment of the invention, the position of the cyclopean eye CE is determined using the measured dominance between the right and left eyes.

For example, the cyclopean eye CE may be positioned on the line between the centers of rotation of the right and left eyes. The position of the cyclopean eye on said line may be determined by the following equation:

$$\overline{CRRE \cdot CE} = \frac{1+e}{2} * (\overline{CRRE \cdot CRLE})$$

with e the dominance rate of the wearer, $\overrightarrow{CRRE \cdot CE}$, the vector between the center of rotation of the right eye and the center of rotation of the cyclopean eye, and $\overrightarrow{(CRRE \cdot CRLE)}$ the vector between the center of rotation of the left eye and the center of rotation of the cyclopean eye.

For example, when e=−1 the cyclopean eye is the right eye, when e=1 the cyclopean eye is the left eye, and when −1<e<1 the cyclopean eye is between the right and left eye.

According to an embodiment of the invention, the method may comprise an eyes-lenses system determining step in which an eyes-lenses system is determined.

The eyes-lenses system determining step may comprises a eye positioning step in which the center of rotation of the left and right eyes are positioned relative to each other, a spectacle lenses positioning step in which the left and right spectacle lenses are positioned relative to the center of rotation of the right and left eyes respectively.

According to an embodiment of the invention, the spectacles lenses may be positioned according to the vertex distance and/or the pantoscopic angle and/or the wrap angle.

Figure 2:
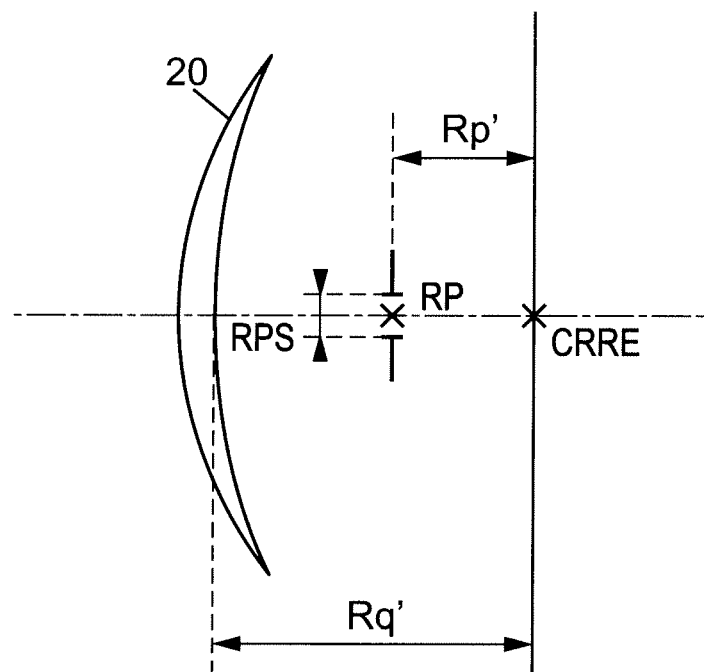
FIG. 2 shows a eyes-lenses system according to an embodiment of the invention.
Figure 2:
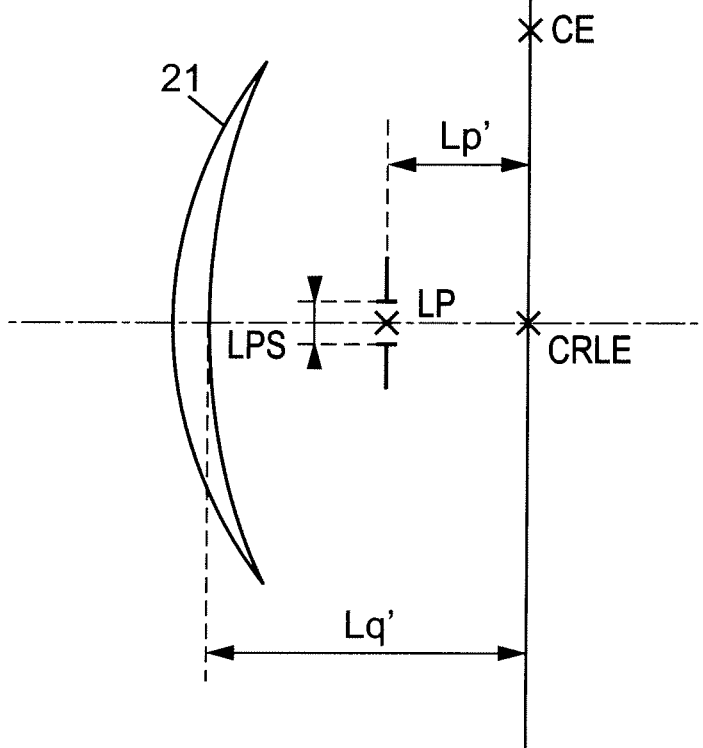

FIG. 2 illustrates a schematic view of a eyes-lenses system.

Referring to FIG. 2, the right eye position can be defined by the center of rotation of the right eye CRRE and the right entrance pupil central point RP. RPS is the right pupil size (not drawn to scale). The distance Rq' between the CRRE and the right lens 20 is generally, but not limited to, set to 25.5 mm, and Rp' defines the position of the right eye entrance pupil with respect to the center of rotation of the right eye CRRE.

Further referring to FIG. 2, the left eye position can be defined by the center of rotation of the left eye CRLE and the left entrance pupil central point LP. LPS is the left pupil size (not drawn to scale). The distance Lq' between the CRLE and the left lens 21 is generally, but not limited to, set to 25.5 mm, and Lp' defines the position of the left eye entrance pupil with respect to the center of rotation of the left eye CRLE.

According to an embodiment of the invention, the distances Rq' and Lq' are determined according to the spectacle data and eye characteristic data.

According to an embodiment of the invention, during the eye positioning step the center of rotation of the left and right eyes are positioned relative to each other according to the measured values.

According to an embodiment of the invention, the cyclopean eye positing step S4 is implemented further to the eyes-lenses system determining step. The cyclopean eye of the wearer is positioned in the eyes-lenses system.

According to an embodiment of the invention, further to the cyclopean eye positing step S4, the method comprises an environment positioning step, in which an environment corresponding to the visual environment data VED provided during the environment providing step S3, is positioned before the eyes-lenses system.

Further to the environment positioning step, the method according to the invention comprises a binocular performance criteria selecting step S5. During the binocular performance criteria selecting step S5, at least one binocular performance criterion BPC which expresses the binocular performance of the pair of spectacle lenses for viewing an object point in the visual environment is defined, for example according to the cyclopean eye.

According to an embodiment of the invention, the binocular performance criterion BPC is selected among one or a combination of the following central vision criteria:
  horizontal prismatic deviation in central vision,
  vertical prismatic deviation in central vision,
  total prismatic deviation in central vision,
  magnification in central vision,
  horizontal ocular deviation in central vision,
  total ocular deviation in central vision, and
  variation of any of the preceding central vision criteria.

According to an embodiment of the invention, the binocular performance criterion BPC is selected among one or a combination of the following central vision criteria:
  horizontal prismatic deviation in central vision,
  total prismatic deviation in central vision,
  magnification in central vision,
  horizontal ocular deviation in central vision,
  total ocular deviation in central vision, and
  variation of any of the preceding central vision criteria.

According to an embodiment of the invention, the binocular performance criterion BPC is selected among one or a combination of the following central vision criteria:
  horizontal prismatic deviation in central vision,
  vertical prismatic deviation in central vision,
  total prismatic deviation in central vision,
  horizontal ocular deviation in central vision,
  total ocular deviation in central vision,
  variation of any of the preceding central vision criteria.

According to an embodiment of the invention, the binocular performance criterion BPC is selected among one or a combination of the following central vision criteria:
  horizontal prismatic deviation in central vision,
  total prismatic deviation in central vision,
  horizontal ocular deviation in central vision,
  total ocular deviation in central vision, and
  variation of any of the preceding central vision criteria.

According to an embodiment of the invention, the binocular performance criterion BPC is selected among one or a combination of the following central vision criteria:
  horizontal ocular deviation in central vision,
  total ocular deviation in central vision, and
  variation of any of the preceding central vision criteria.

According to an embodiment of the invention, the binocular performance criterion BPC is selected among one or a combination of the following central vision criteria:
  total prismatic deviation in central vision,
  horizontal ocular deviation in central vision,
  total ocular deviation in central vision, and
  variation of any of the preceding central vision criteria.

According to an embodiment of the invention, the binocular performance criterion BPC is total ocular deviation in central vision.

According to an embodiment of the invention, the binocular performance criterion BPC is selected among one or a combination of the following central vision criteria:
  total prismatic deviation in central vision,
  total ocular deviation in central vision, and
  variation of any of the preceding central vision criteria.

According to an embodiment of the invention, the binocular performance criterion BPC is selected among one or a combination of the following peripheral vision criteria:
  power in peripheral vision,
  astigmatism in peripheral vision,
  horizontal prismatic deviation in peripheral vision,
  vertical prismatic deviation in peripheral vision,
  total prismatic deviation in peripheral vision,
  total pupil field ray deviation,
  vertical pupil field ray deviation,
  horizontal pupil field ray deviation,
  magnification in peripheral vision, and
  variation of any of the preceding peripheral vision criteria.

According to an embodiment of the invention, the binocular performance criterion BPC is selected among one or a combination of the following peripheral disparity vision criteria:
  added horizontal disparity,
  total horizontal disparity,
  added vertical disparity, and
  total vertical disparity.

According to an embodiment of the invention, the binocular performance criterion BPC is selected among one or a combination of the following peripheral cyclodisparity vision criteria:
  rotation binocular cyclodisparity,
  fusional horizontal translation, and
  fusional vertical translation.

Further to the binocular performance criteria defining step S5, the method according to the invention comprises a binocular performance criteria determining step S6.

In order to compute a criterion, ray tracing method can be used. Ray tracing has special features according to the model of the eyes-lenses system.

Figure 3:
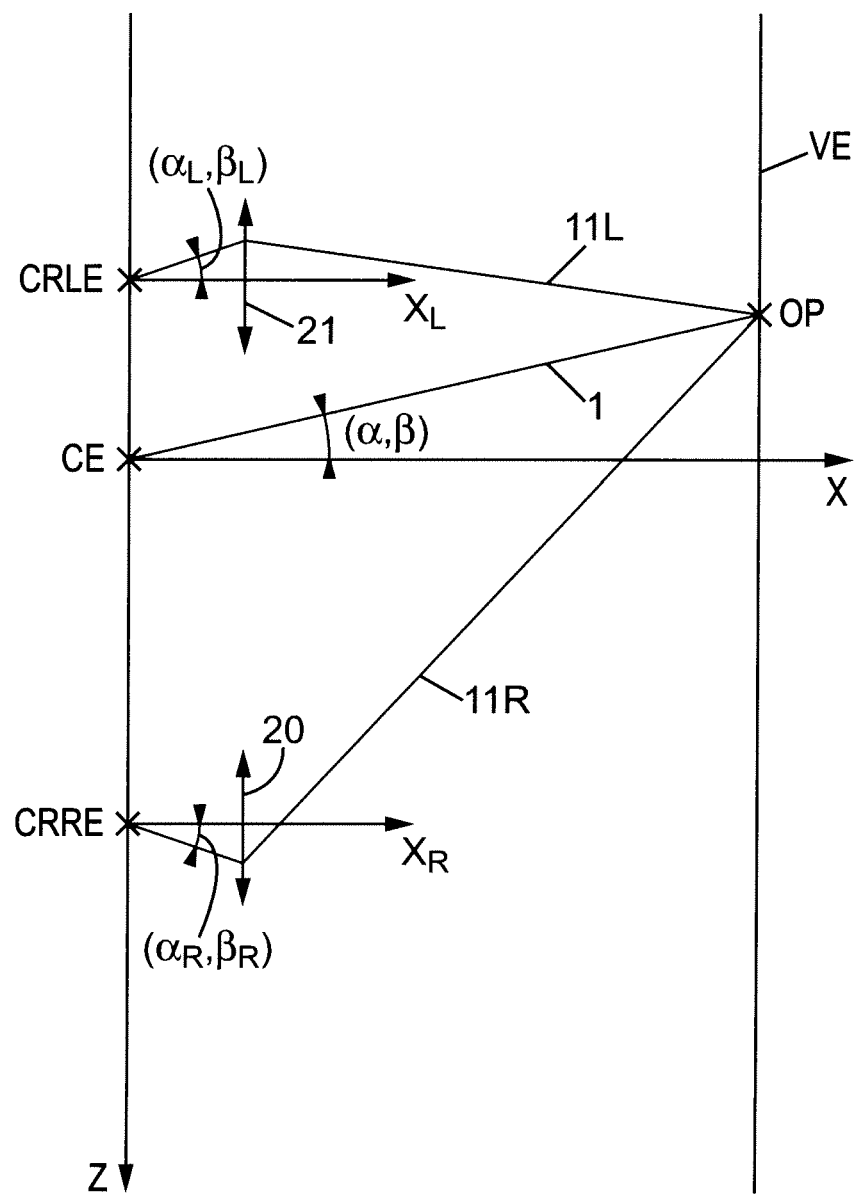
FIG. 3 shows a ray tracing from the center of rotation of an eye.

FIG. 3 illustrates a model for central vision in the purpose of assessing a criterion in a central vision situation by ray tracing. In a central vision situation, the eye rotates about its center of rotation as well as the entrance pupil of the eye. The visual environment is sampled based on a cyclopean gaze direction. A gaze direction is defined by two angles (α,β) measured with regard to reference axes R=(X,Y,Z) centered on the cyclopean eye of the wearer CE.

For each cyclopean gaze direction (α,β) a corresponding object point OP of the visual environment is determined. For example a gaze ray 1 is built from the cyclopean eye in the gaze direction (α,β).

A left direction $(\alpha_L,\beta_L)$ of a ray 11L starting from the center of rotation of the left eye CRLE and focusing trough the left spectacle lens 21 to the object point OP of the visual environment VE is determined.

A right direction $(\alpha_R,\beta_R)$ of a ray 11R starting from the center of rotation of the right eye CRRE and focusing trough the right spectacle lens 20 to the object point OP of the visual environment VE is determined.

According to an embodiment of the invention, a left monocular performance criterion for the left spectacle lens 21 is determined in the left direction $(\alpha_L,\beta_L)$ and a right monocular performance criterion for the right spectacle lens 20 is determined in the right direction $(\alpha_R,\beta_R)$.

The binocular criterion is determined for each cyclopean gaze direction (α,β) according to the right and left monocular performance criterion in the right direction $(\alpha_R,\beta_R)$ and left direction $(\alpha_L,\beta_L)$.

Figure 4:
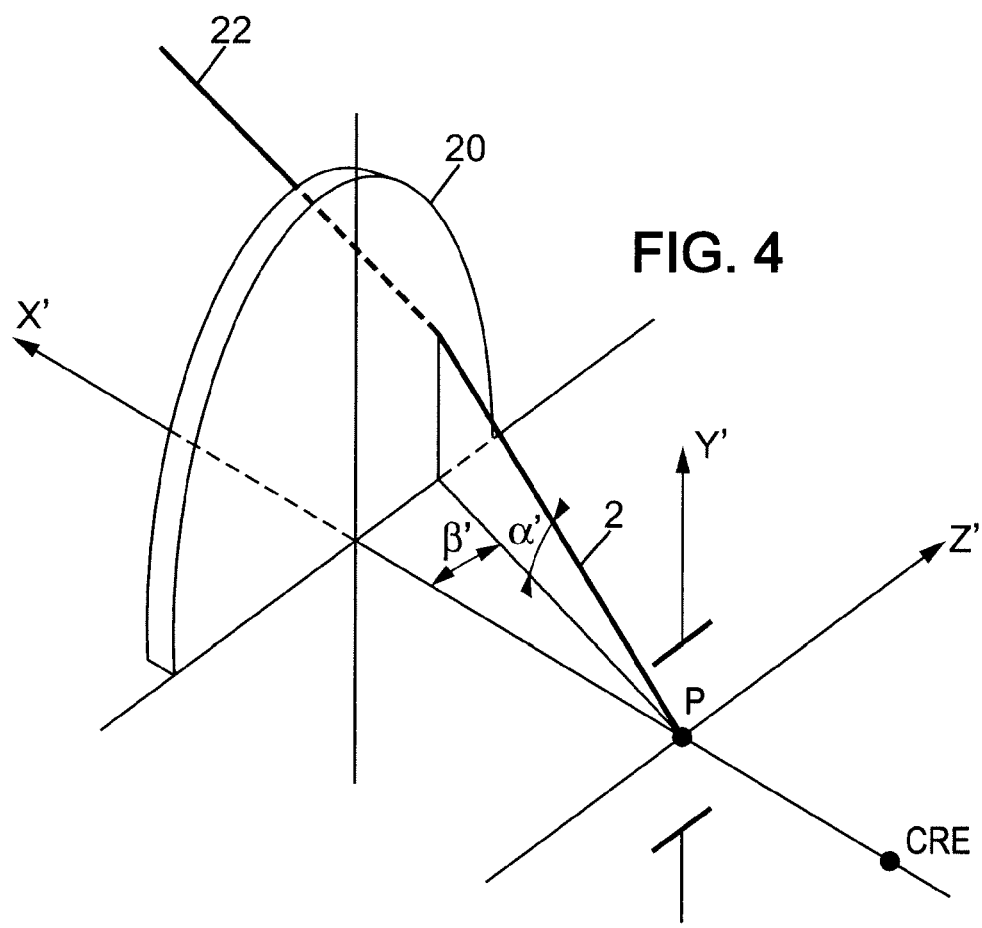
FIG. 4 shows a ray tracing from the center of the eye entrance pupil.

FIG. 4 illustrates a model for peripheral vision in the purpose of assessing a criterion in a peripheral vision situation through ray tracing.

According to an embodiment of the invention, the method to determine the binocular performance of a pair of spectacles lenses in the peripheral vision corresponds to the method for central vision with the proviso that the right $(\alpha_R,\beta_R)$ and left $(\alpha_L,\beta_L)$ directions start from the right and left pupil and not the center of rotation of the right and left eyes.

As for central vision criteria, the visual environment is sampled based on a cyclopean gaze direction. A gaze direction is defined by two angles (α,β) (not represented) measured with regard to reference axes R=(X,Y,Z) centered on the cyclopean eye of the wearer CE.

For each cyclopean gaze direction (α,β) a corresponding object point OP of the visual environment is determined.

For the right and left eyes, the monocular performance criteria are evaluated as illustrated on FIG. 4. A gaze direction (α,β) (not represented here) is fixed, and an object of the visual environment VE is viewed in a peripheral ray direction different from the gaze direction. A peripheral ray direction is defined by two angles (α',β') measured with regard to reference axes R'=(X',Y',Z') centered on the eye entrance pupil and moving along the gaze direction axis given by the fixed direction (α,β) and represented by axis X' on FIG. 4. For assessing a monocular peripheral vision criterion in a peripheral ray direction (α',β'), a peripheral ray 2 is built from the center of the pupil P in a peripheral ray direction (α',β'). 22 is the incident ray after passing through the lens 20.

As for central vision criteria the binocular criterion is determined for each cyclopean gaze direction (α,β) according to the right and left monocular performance criterion in the right direction $(\alpha_R,\beta_R)$ and left direction $(\alpha_L,\beta_L)$.

According to an embodiment of the invention, the binocular performance criterion in central and/or peripheral vision is determined using a linear combination or a substantially linear combination of the right and left monocular performance criteria, for example a difference. In the sense of the invention a substantially linear combination may be defined as a combination of linear element and non-linear element, wherein the non-linear element has a value small compared to the linear elements, for example at least 10 time smaller.

According to an embodiment of the invention, a binocular criteria may be defined as: Mono A−Mono B+ε, with Mono A and Mono B a first and second monocular criteria and ε a non-linear function of Mono A and Mono B whose absolute value is small compared to Mono A and Mono B. For example $$\varepsilon = \frac{(MonoA)*(MonoB)}{10^N}$$

with N a integer greater or equal to 1.

According to an embodiment of the invention, the binocular criteria may be defined as a non linear combination of monocular criteria, for example:
  Min (Mono A, Mono B), or
  Max (Mono A, Mono B), or
  Root mean square (Mono A, Mono B).

According to an embodiment of the invention, the binocular performance criterion in central and/or peripheral vision is the average value of the right and left monocular criteria.

FIGS. 5 to 9 illustrate criterion evaluation methods according to the present invention.

Figure 5:
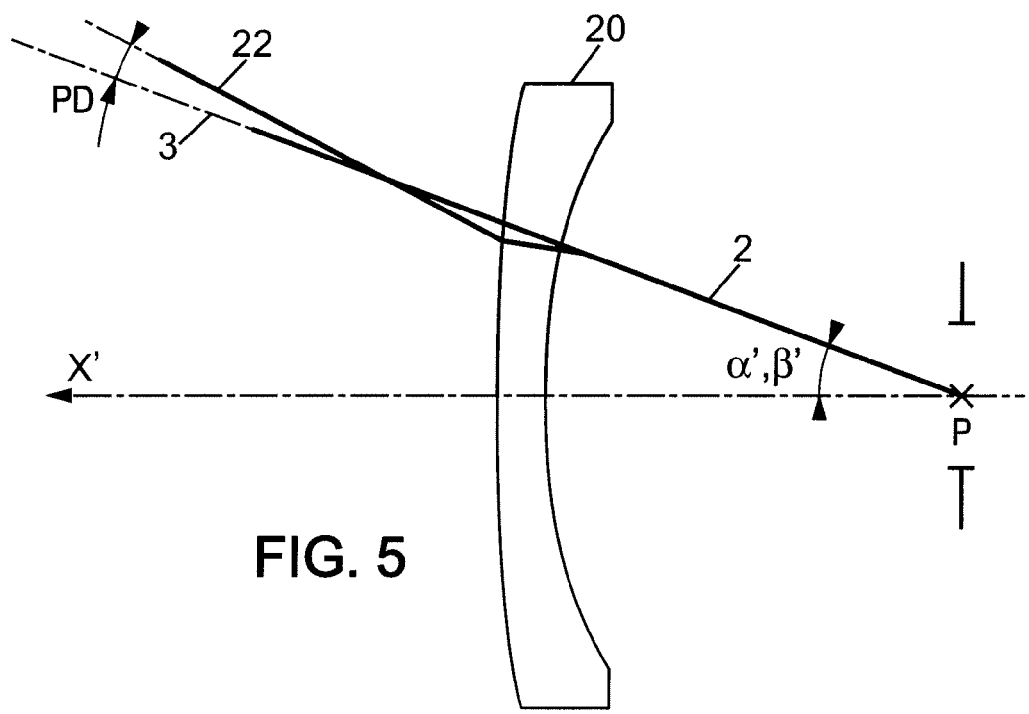
FIG. 5 illustrates prismatic deviation in peripheral vision.

FIG. 5 illustrates ray tracing for estimating prismatic deviation PD in peripheral vision. Prismatic deviation in peripheral vision is estimated through ray tracing of a peripheral ray associated to a peripheral ray direction (α',β') given with regard to reference axes centered on the center of the entrance pupil and moving along the gaze direction, as discussed hereinabove. A ray 2 issued from the center of the entrance pupil in peripheral ray direction (α',β') with the gaze direction axis X' is traced. Incident ray 22 corresponding to ray 2 is then built. Prismatic deviation represents the angle between incident ray 22 and a virtual ray 3 issued from the center of the pupil in the direction of ray 2 and not deviated by the prism of lens 20.

Figure 6:
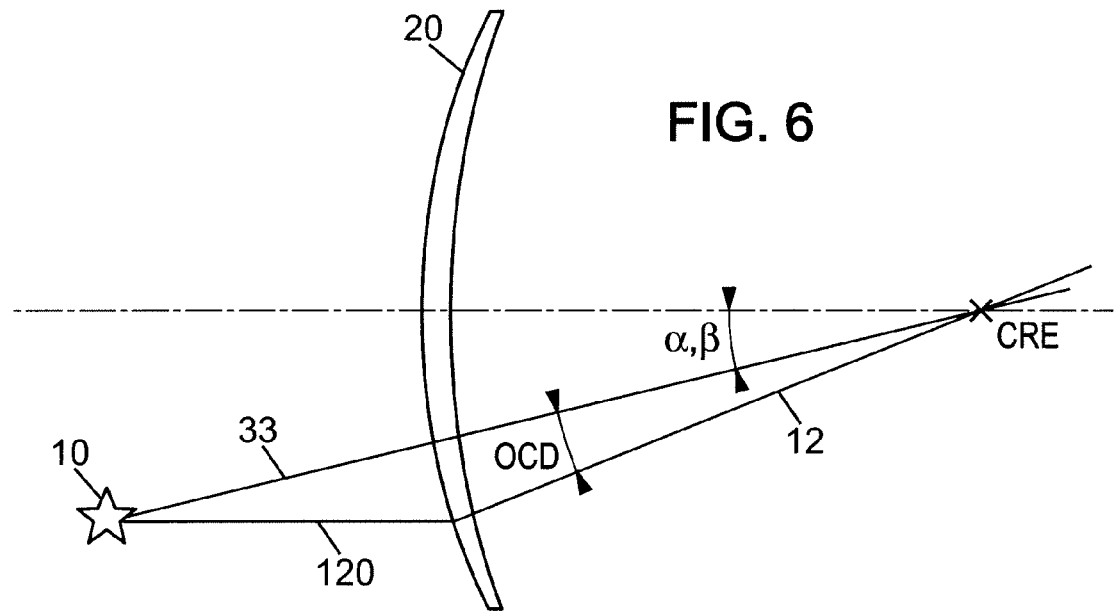
FIG. 6 illustrates ocular deviation.

FIG. 6 describes ocular deviation OCD. It shows a first ray 33 coming from an object 10 when no lens is placed in its path to the CRE, and a second ray 120 coming from the same object whose path is modified by the addition of a lens 20. Ray 12 corresponds to ray 120 in the image space after passing through the lens 20. The ocular deviation OCD in a direction (α,β) is estimated in central vision and is defined as the angle between:
  the direction of the eye targeting an object without lens (represented by ray 33) and
  the direction of the eye targeting the same object when said lens is placed in front of the viewer eyes (represented by ray 12).

Figure 7:
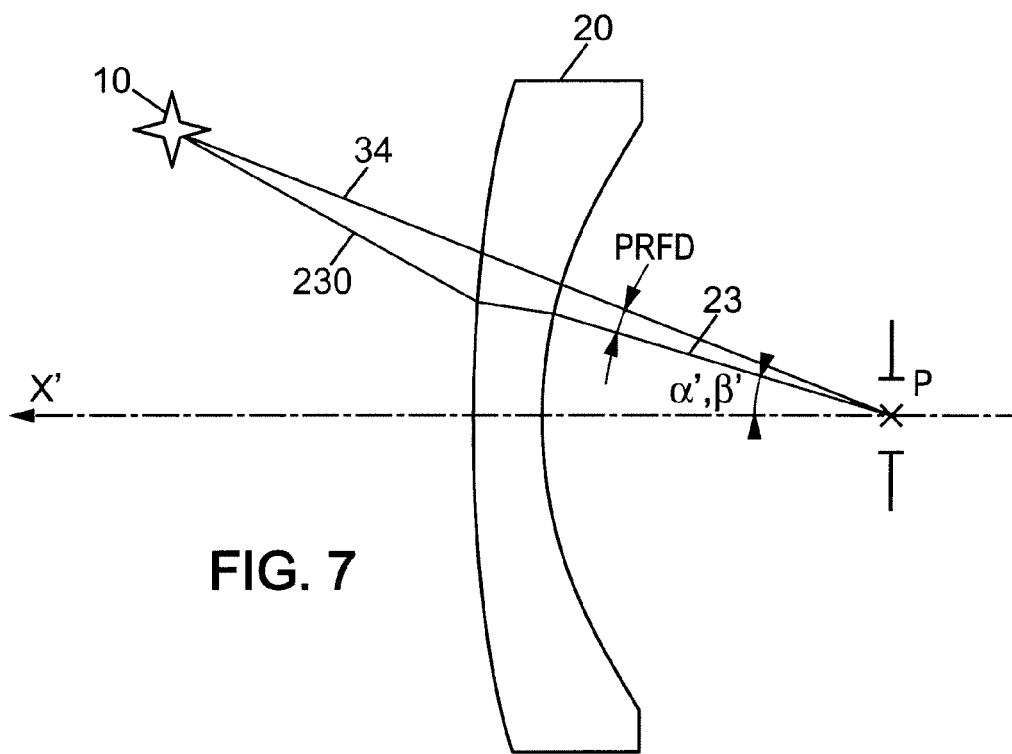
FIG. 7 illustrates pupil ray field deviation.

FIG. 7 illustrates total pupil ray field deviation PRFD, it shows a first ray 34 coming from an object 10 located in the peripheral field of view when no lens is placed in its path to the eye entrance pupil, and a second incident ray 230 coming from the same object whose path is modified by the introduction of a lens 20. Ray 23 corresponds in the image field to incident ray 230.

Total pupil field ray deviation PRFD is estimated in peripheral vision and is defined as the angle, measured in the image space, between
  a straight ray 34 coming from an object localised in the peripheral field of view of an eye and entering the center of the pupil, and
  a ray 23 coming from the same object and entering the center of the pupil when said lens is placed on the eyes of the wearer.

Horizontal pupil field ray deviation corresponds to the horizontal component of the total pupil field ray deviation PRFD.

Vertical pupil field ray deviation corresponds to the vertical component of the total pupil field ray deviation PRFD.

Figure 8:
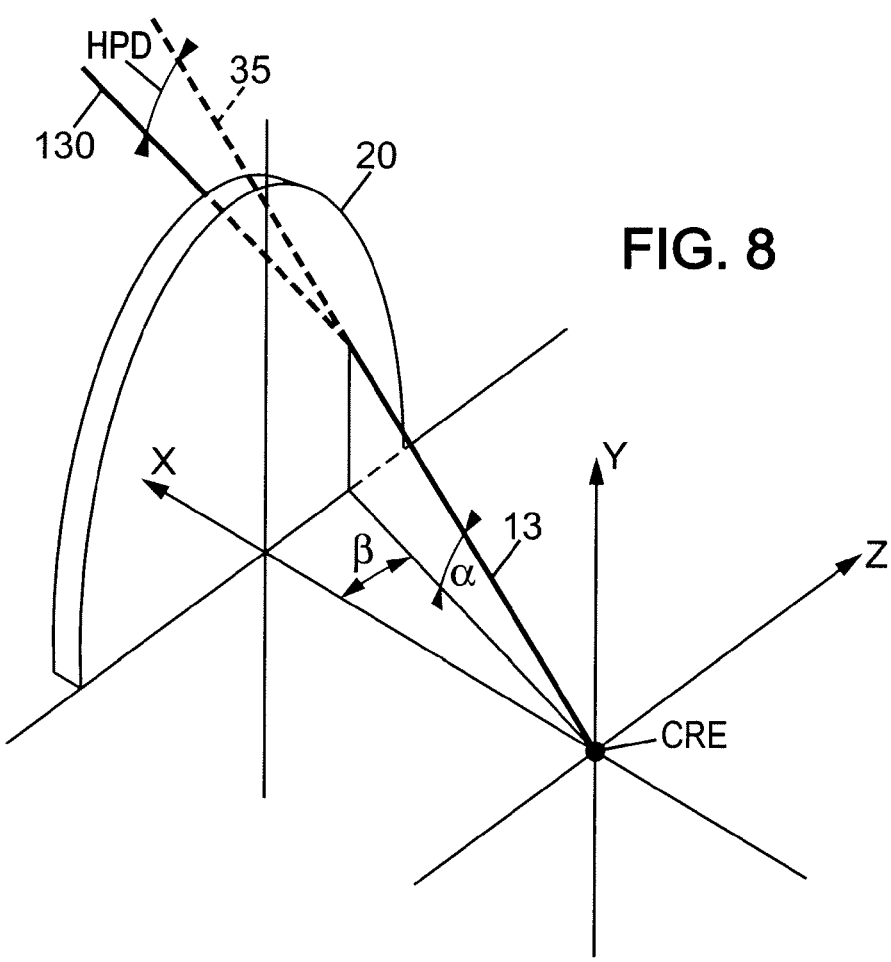
FIG. 8 illustrates horizontal prismatic deviation in central vision.

FIG. 8 illustrates horizontal prismatic deviation HPD in central vision. Prismatic deviation is defined as the angular difference between ray 130 and ray 35 in a same horizontal plan. Ray 130 is the image of the ray 13 in the object space. Ray 13 is issued from the eye rotation center according to direction ($\alpha,\beta$) in the fixed reference axes (X,Y,Z) centered on the eye rotation center as represented on FIG. 8. Ray 35 is a virtual ray issued from the eye rotation center according to direction ($\alpha,\beta$) and not deviated by the prism of the lens. Horizontal prismatic deviation HPD is the component of the prismatic deviation in the plane (XOZ) and can be calculated through:

$$HPD = \left( \text{Arcsin}\left( \left( \frac{V_{ini}^h \wedge V_{fin}^h}{\|V_{ini}^h\|\|V_{fin}^h\|} \right) \cdot \vec{y} \right) \right),$$

wherein $V^h = V - \vec{y}(V \cdot \vec{y})$, and $V_{ini}$ and $V_{fin}$ are direction vectors of alternatively ray 13 and 130.

Figure 9:
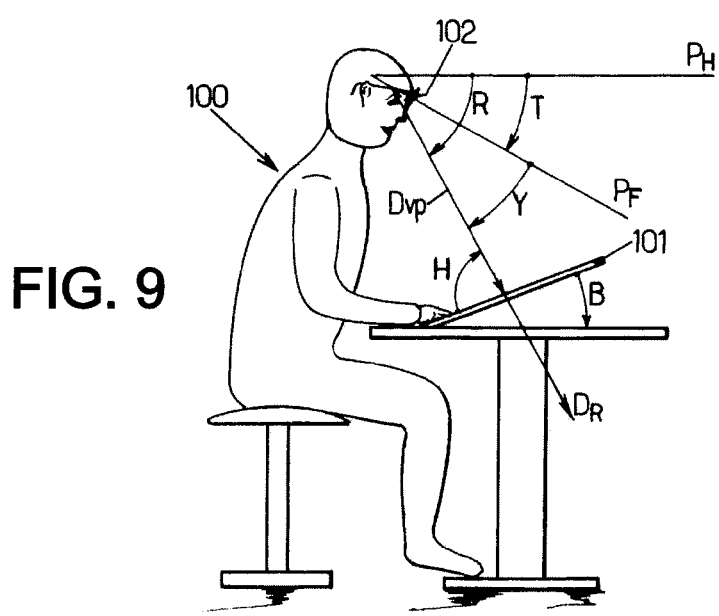
FIG. 9 illustrates postural parameters.

FIG. 9 illustrate examples of postural parameters that may be used to customize the visual environment according to the invention. The parameters illustrated on FIG. 9 are:
- the Francfort plan $P_F$ that indicates the vertical inclination of the heads of the wearer 100,
- the horizontal plan of reference $P_H$,
- the vertical slope angle T of the head of the wearer, measured in a vertical plan between the plans $P_H$ and $P_F$,
- the gaze direction $D_R$ of the wearer 100,
- the lowering gaze angle R, measured in a vertical plan between the plan $P_H$ and the gaze direction $D_R$,
- the lowering or raising of the eyes angle Y, measured in a vertical plan between the plans $P_F$ and the gaze direction $D_R$,
- the document slope angle B of document 101 read by the wearer 100, measured in a vertical plan between an horizontal plan and the plan of document 101,
- the horopter angle H, measured in a vertical plan between the plan of document 101 and the gaze direction $D_R$;
- the reading distance in near vision Dvp, measured along the gaze direction $D_R$ between the eyes of the wearer 100 and the part of the document 101 that is being read by the wearer.

Figure 10A:
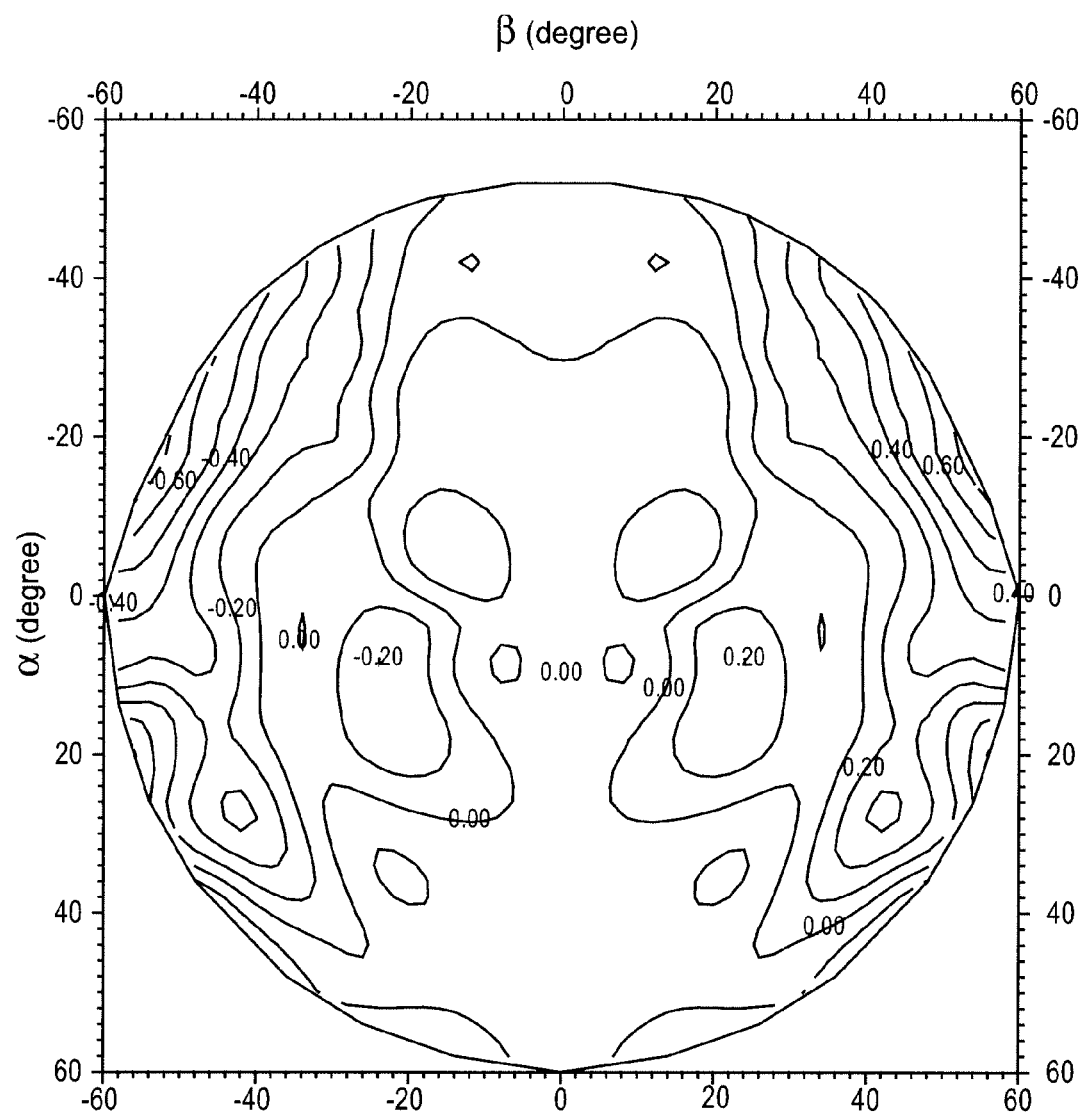
FIGS. 10a and 10b illustrate the contour plot of the difference in power between the right and left spectacle lenses determined using a method of the invention.
Figure 10B:
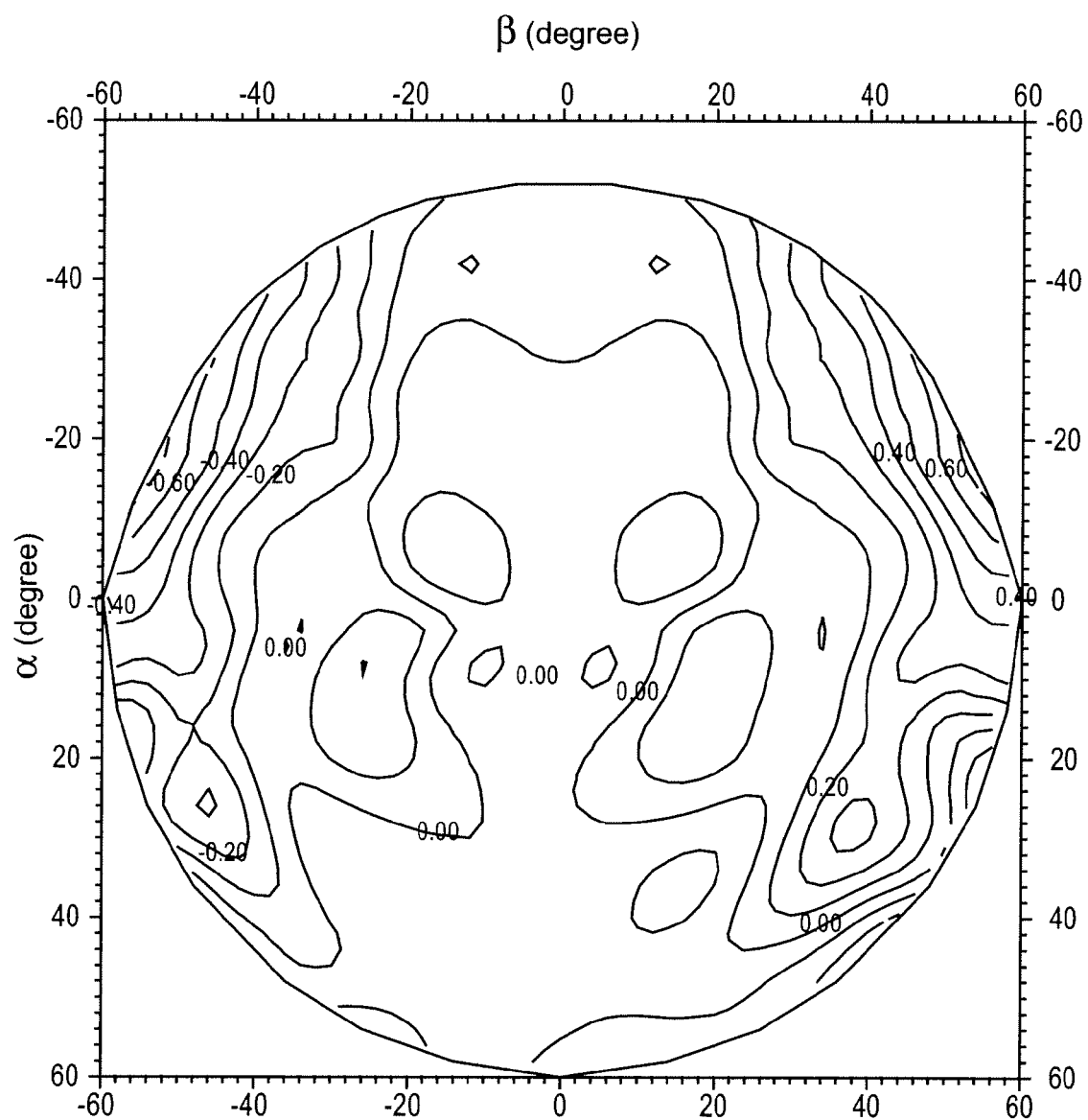

The effect of customizing the position of the cyclopean eye is illustrated on FIGS. 10a and 10b.

FIG. 10a represents the contour plot of the difference in power between the right and left spectacle lens determined using a method of the invention where the cyclopean eye is centered between the right and left eyes.

FIG. 10b represents the contour plot of the difference in power between the same right and left spectacle lenses than for FIG. 10a, determined using a method of the invention where the cyclopean eye is positioned at the center of rotation of the left eye of the wearer.

It appears when comparing FIGS. 10a and 10b that the performance of a given pair of spectacle lenses is influenced by the position of the cyclopean eye of the wearer and therefore by the dominance of the wearer.

The invention has been described above with the aid of embodiments without limitation of the general inventive concept.

The invention claimed is:

1. A method implemented by computer means for determining binocular performance of a pair of spectacle lenses when a visual environment is seen by the right and left eyes of a wearer through right and left spectacle lenses respectively, comprising:
   an eyes characteristics providing step in which eyes characteristics data representing the characteristics of the right and left eyes of the wearer are provided,
   a pair of spectacle lenses providing step in which spectacle data representing the pair of spectacle lenses are provided,
   an environment providing step in which visual environment data representing a visual environment are provided,
   a binocular performance criteria selecting step in which at least one binocular performance criterion which expresses the binocular performance of the pair of spectacle lenses for viewing an object point in the visual environment is selected,
   a binocular performance criteria determining step in which the at least one binocular performance criterion is determined for a plurality of object points distributed in the visual environment,
   wherein the at least one binocular performance criterion is selected among one or a combination of the following criteria groups consisting of:
   central vision criteria group consisting of:
   total prismatic deviation in central vision,
   horizontal ocular deviation in central vision,
   total ocular deviation in central vision,
   derivative of any of the preceding central vision criteria,
   peripheral vision criteria group consisting of:
   power in peripheral vision,
   astigmatism in peripheral vision,
   horizontal prismatic deviation in peripheral vision,
   vertical prismatic deviation in peripheral vision,
   total prismatic deviation in peripheral vision,
   total pupil field ray deviation,
   horizontal pupil field ray deviation,
   vertical pupil field ray deviation,
   magnification in peripheral vision,
   variation of any of the preceding peripheral vision criteria,
   added horizontal disparity,
   total horizontal disparity,
   added vertical disparity,
   total vertical disparity,
   rotation binocular cyclodisparity,
   fusional horizontal translation, and
   fusional vertical translation.

2. The method according to claim 1, wherein the method further comprises a cyclopean eye positioning step in which the cyclopean eye of the wearer is positioned, and wherein the position of the cyclopean eye is customized according to the wearer.

3. The method according to claim 2, wherein the binocular performance criteria determining step comprise:
   a cyclopean gaze direction sampling step in which the visual environment is sampled based on a cyclopean gaze direction,
   a object point determining step in which for each cyclopean gaze direction, a corresponding object point of the visual environment is determined,
   a left eye direction determining step in which for each of the object points determined during the object point determining step the left direction of a ray starting from the center of rotation of the left eye and focusing trough the left spectacle lens to the corresponding object point of the visual environment is determined, a right eye direction determining step in which for each of the object points determined during the object point determining step the right direction of a ray starting from the center of rotation of the right eye and focusing trough the right spectacle lens to the corresponding object point of the visual environment is determined, a left eye monocular performance criteria determining step in which for each of the directions determined during the left eye direction determining step at least one left monocular performance criterion for the left spectacle lens is determined, a right eye monocular performance criteria determining step in which for each of the directions determined during the right eye direction determining step at least one right monocular performance criterion for the right spectacle lens is determined, and wherein at least one binocular criterion is determined according to the at least one right and left monocular performance criterion.

4. The method according to claim 2, wherein the binocular performance criteria determining step comprise:

a cyclopean gaze direction determining step in which a cyclopean gaze direction is determined, a first object point determining step in which for the cyclopean gaze direction a corresponding object point of the visual environment is determined, a left eye direction determining step in which for the object point determined during the first object point determining step the left direction of a ray starting from the center of rotation of the left eye and focusing trough the left spectacle lens to the corresponding object point of the visual environment is determined, a left pupil positioning step in which the pupil of the left eye corresponding to the left direction is positioned, a right eye direction determining step in which for the first object point determined during the object point determining step the right direction of a ray starting from the center of rotation of the right eye and focusing trough the right spectacle lens to the corresponding object point of the visual environment is determined, a right pupil positioning step in which the pupil of the right eye corresponding to the right direction is positioned, a cyclopean gaze direction sampling step in which the visual environment is sampled based on a cyclopean gaze direction, a second object point determining step in which for each cyclopean gaze direction a corresponding object point of the visual environment is determined, a left pupil direction determining step in which for each of the object points determined during the second object point determining step the left direction of a ray starting from the pupil of the left eye and focusing trough the left spectacle lens to the corresponding object point of the visual environment is determined, a right pupil direction determining step in which for each of the object points determined during the second object point determining step the right direction of a ray starting from the pupil of the right eye and focusing trough the right spectacle lens to the corresponding object point of the visual environment is determined, a left eye monocular performance criteria determining step in which for each of the directions determined during the left pupil direction determining step at least one left monocular performance criterion for the left spectacle lens is determined, a right eye monocular performance criteria determining step in which for each of the directions determined during the right pupil direction determining step at least one right monocular performance criterion for the right spectacle lens is determined, and wherein at least one binocular criterion is determined according to the at least one right and left monocular performance criterion.

5. The method according to claim 1, wherein the method further comprises a eye positioning step in which the center of rotation of the left and right eyes are positioned relative to each other.

6. The method according to claim 5, wherein the eyes characteristics data comprise measured values of the relative position of the left and right eyes of the wearer, and during the eye positioning step the center of rotation of the left and right eyes are positioned relative to each other according to the measured values.

7. The method according to claim 1, wherein the visual environment data are customized according to the age of the wearer and/or the posture of the wearer and/or the ethnicity of the wearer and/or the type of environment in which the wearer is to use the spectacle lenses, and/or the prescription of the wearer, and/or the activities of the wearer, and/or the head/eye coordination of the wearer, and/or the anatomy of the wearer.

8. The method according to claim 1, wherein the spectacle data comprise mounting data of the spectacle lenses and the method further comprises, and prior to the binocular performance criteria determining step, a spectacle lenses positioning step in which the spectacle lenses are positioned according to the mounting data.

9. The method according to claim 1, wherein the spectacle data comprise for the right and left spectacle lenses the vertex distance and/or the pantoscopic angle and/or the wrap angle of the spectacle lens, and the method further comprises, prior to the binocular performance criteria determining step, a spectacle lenses positioning step in which the left and right spectacle lenses are positioned relative to the center of rotation of the right and left eyes respectively according to the vertex distance and/or the pantoscopic angle and/or the wrap angle.

10. A method for optimizing at least a lens of a pair of spectacle lenses by optimizing the value of at least one binocular performance criterion determined according to claim 1.

11. The method for optimizing at least a lens of a pair of spectacle lenses by optimizing the value of at least one binocular performance criterion determined according to claim 10, wherein the method further comprises:

a lenses providing step, in which a pair of spectacle lenses is provided, and a modifying step, in which at least one of the two lens is modified, wherein the binocular performance determining step and the modifying step are implemented by technical means and repeated so as to optimize the binocular performance of the pair of spectacle lenses.

12. A method for manufacturing a pair of spectacle lenses comprising successively:

an optimizing step, in which the pair of spectacle lenses is optimized using the method according to claim 10 and a manufacturing step, in which the pair of spectacle lenses is manufactured.

13. A computer program product comprising one or more stored sequence of instruction that is accessible to a processor and which, when executed by the processor, causes the processor to carry out the steps of claim 10.

14. A computer readable medium carrying one or more sequences of instructions of the computer program product of claim 13.

15. A computer program product comprising one or more stored sequence of instruction that is accessible to a processor and which, when executed by the processor, causes the processor to carry out the steps of claim 1.

16. A computer readable medium carrying one or more sequences of instructions of the computer program product of claim 15.

* * * * *